United States Patent [19]

Sham

[11] Patent Number: 5,144,516
[45] Date of Patent: Sep. 1, 1992

[54] LEAKAGE CURRENT CIRCUIT INTERRUPTER DEVICE

[75] Inventor: John C. K. Sham, Hong Kong, Hong Kong

[73] Assignee: Wing Shing Products Company, Ltd., Aberdeen, Hong Kong

[21] Appl. No.: 650,056

[22] Filed: Feb. 4, 1991

[51] Int. Cl.$^5$ .............................. H02H 3/16
[52] U.S. Cl. ........................ 361/49; 361/50; 361/115; 335/167
[58] Field of Search ............ 361/49, 50, 115; 335/167, 168, 169

[56] References Cited

U.S. PATENT DOCUMENTS

| | | | |
|---|---|---|---|
| 2,811,601 | 10/1957 | Somers | 335/167 |
| 3,706,916 | 12/1972 | Halbeck et al. | 335/13 |
| 3,745,492 | 7/1973 | Grunert | 335/167 |
| 3,806,845 | 4/1974 | Zubaty et al. | 335/18 |
| 4,037,183 | 7/1977 | Gaskill | 361/115 |
| 4,337,447 | 6/1982 | Lemmer | 335/167 |
| 4,378,543 | 3/1983 | Melter et al. | 335/167 |
| 4,709,293 | 11/1987 | Gershen et al. | 361/50 |
| 4,802,052 | 1/1989 | Brant et al. | 361/42 |
| 4,860,147 | 8/1989 | Fai | 361/50 |
| 4,893,101 | 1/1990 | Robitaille | 335/118 |
| 4,939,615 | 7/1990 | Brant et al. | 361/42 |
| 5,019,935 | 5/1991 | Nakamura | 361/49 |
| 5,029,037 | 7/1991 | Bartelink | 361/49 |

FOREIGN PATENT DOCUMENTS

| | | | |
|---|---|---|---|
| 2529713 | 1/1976 | Fed. Rep. of Germany | 361/115 |
| 0153787 | 3/1956 | Sweden | 361/115 |
| 0588144 | 5/1947 | United Kingdom | 361/115 |

*Primary Examiner*—Steven L. Stephan
*Assistant Examiner*—Thomas M. Dougherty
*Attorney, Agent, or Firm*—Dilworth & Barrese

[57] ABSTRACT

A leakage current interrupter device for use with appliances. The device of the present invention includes a switching device having an electromagnet which is energized by a sensing circuit upon the detection of leakage current or a ground fault condition. The magnetic field generated by the electromagnet moves a lever arm to instantaneously interrupt the flow of current through the circuit to disconnect the appliance from the power supply.

25 Claims, 3 Drawing Sheets

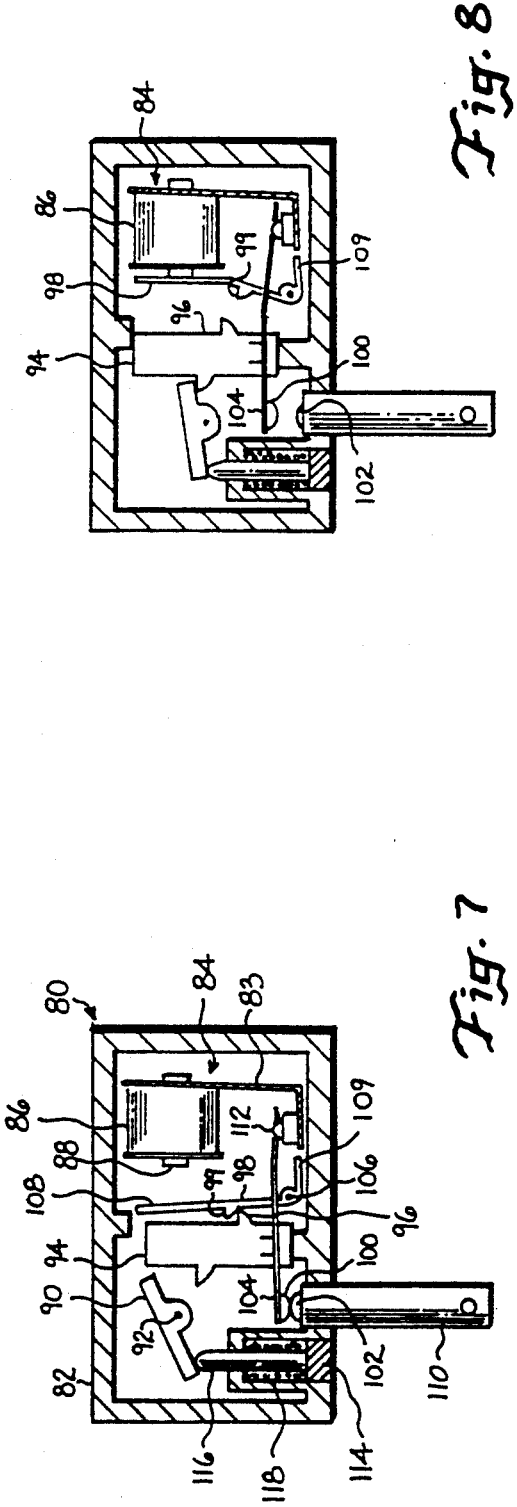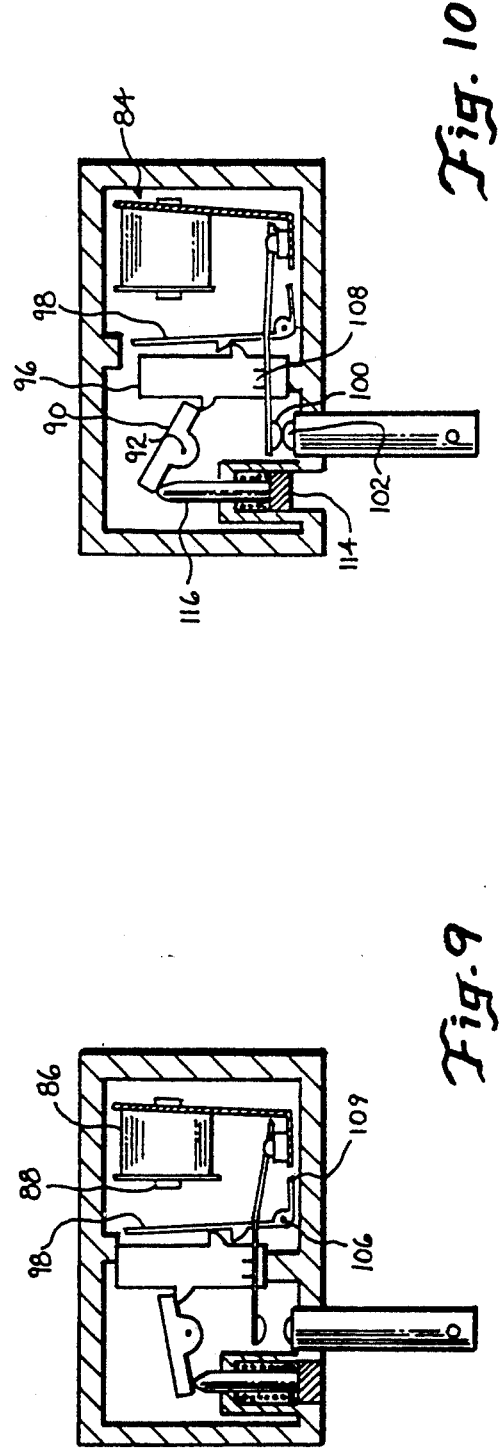

LEAKAGE CURRENT CIRCUIT INTERRUPTER DEVICE

BACKGROUND OF THE INVENTION

1. Field of the Invention

The present invention relates to switching devices for circuits which interrupt the circuit upon the detection of leakage current, and more particularly to a switching device which interrupts the circuit upon the detection of leakage current in an appliance to prevent electrical shock.

2. Discussion of the Prior Art

Switching devices which interrupt a circuit upon the detection of leakage current or ground faults in the circuit for use with appliances are well known in the art. Appliances such as hair dryers, curling irons, electric shavers, and other personal grooming appliances are typically used in an environment where water is present which subjects the user to an increased risk of electrical shock. Many other appliances, such as heaters, radios, and the like, are also used in many cases in locations where water may be present, so that people occupying such areas are at risk to electric shock in the event a ground fault develops between the appliance and any surface water which may be present.

Consequently, a need has arisen to provide protection to users of such appliances to prevent inadvertent electric shock through carelessness or accidental placement of the appliance which subjects the appliance to a ground fault condition. In the appliance industry, it is now an important safety consideration to provide a circuit interrupting device which interrupts the electrical path from the power source to the appliance upon the detection of a predetermined leakage current level or ground fault condition in which the device instantaneously interrupts the circuit to prevent any further flow of electricity from the power source to the appliance.

In particular, safety testing organizations such as Underwriters Laboratories Inc. now require many appliances to have such a circuit interruption mechanism in order to pass the safety requirements designated for the particular appliance. In response to such requirements, many types of circuit interrupter devices have been developed in the prior art to provide means for instantaneously disconnecting the appliance from the power source upon the detection of a predetermined leakage current value or ground fault condition which would place the user at a potentially fatal risk of electric shock.

Typical circuit interrupter devices present in the prior art provide electromagnetic switching devices which utilize a solenoid having a movable core member which either retracts or extends to trip a mechanical linkage mechanism to instantaneously open the circuit to interrupt the flow of current to the appliance with which the circuit is used. Many of these devices provide means for resetting the circuit after the fault condition is eliminated, and the reset feature may be activated only upon removal of the dangerous condition.

Other types of circuit interrupters for use with electrical appliances provide a magnetic means in which a magnetic field is created to attract or repel a linkage member which will open the circuit upon the detection of a predetermined leakage current level. A typical device is shown in U.S. Pat. No. 4,706,153 to Sainomoto et al., which provides a magnetic core member which upon energization creates a magnetic field to attract a metallic member to the core to open the circuit upon the detection of leakage current. A transformer relay is provided which creates the magnetic field to attract the metallic member towards the core to open the circuit.

The devices shown in the prior art suffer several disadvantages which affect both the performance of the switching device and its cost of manufacture, which in many cases may prohibit a manufacturer of certain appliances from using such a device. For example, an important consideration in the hair dryer industry at this time is the cost of manufacture of the circuit interrupter switching device in relation to the overall cost of the hair dryer. It is not uncommon for many of the prior art devices to have a manufacturing cost which is at least 50% of the total cost of the hair dryer. Accordingly, many of the prior art devices utilizing elaborate mechanical linkages and interconnected members which trip the circuit in response to the energization of a solenoid resulting in the retraction or extension of a movable core member increase the cost of manufacture of the switching device to a prohibitive level for the appliance manufacturer. Furthermore, the incorporation of many moving parts and complex linkage mechanisms inside the switch requires greater spacing internally of the switching device and in many cases additional lubrication is necessary to insure instantaneous response of the device upon the detection of leakage current.

The novel appliance circuit interrupter switching device of the present invention obviates the disadvantages encountered in the prior art and provides an efficient and instantaneously responsive switching mechanism for interrupting an electrical circuit to an appliance upon the detection of a predetermined level of leakage current to prevent electrical shock to a user. The device of the present invention opens the circuit with a minimum of moving parts, which results in a low cost, yet highly reliable switching mechanism for lowering the cost of manufacture of the end use appliance.

SUMMARY OF THE INVENTION

The present invention provides a novel switching mechanism for interrupting the electrical circuit to an appliance which provides for instantaneous response to the detection of a predetermined leakage current level or ground fault condition. Upon the detection of leakage current, the switching device of the present invention instantaneously opens both leads to the circuit, so that both the hot lead and the neutral lead are opened to provide greater safety. An electromagnet having a solid core is provided to generate a magnetic field to repel a contact arm in one embodiment to open the circuit, and to attract a latching mechanism to open the circuit in a second embodiment. The number of moving parts is greatly reduced, making the switching device more reliable while decreasing the cost of manufacture.

The appliance circuit interrupter switching device of the present invention may be used with any electrical appliance in which the possibility of immersion of the device in water or contact of the electrical circuit of the appliance with water is present. A sensing circuit, which is conventional in the art, is provided which may be part of the switching device or located in the appliance itself which detects the presence of a ground fault or an unsafe leakage current level and signals the switching device to open the circuit.

The switching device itself essentially comprises an electromagnet device having a solid core which is responsive to a signal generated by the sensing circuit upon the detection of an unsafe condition. A pair of stationary contacts and a pair of movable contacts are provided, which contact each other to complete the circuit to provide electricity to the appliance. A lever mechanism is provided to maintain the contacts in the engaged position, and in one embodiment the lever is provided with a permanent magnet which is attracted to the solid core of the electromagnet to maintain the contacts in the engaged position. Upon detection of an unsafe condition, the sensing circuit provides a signal to the electromagnet to energize the electromagnet, which generates a magnetic field. The magnetic field generated is of the same polarity as the polarity of the permanent magnet, which serves to repel the permanent magnet from the core of the electromagnet. As the permanent magnet, and consequently the lever arm, are repelled from the electromagnet the movable contacts, which are biased away from the stationary contacts, move away from the stationary contacts to open the circuit. The entire mechanism is enclosed in a housing, and a reset button is provided which extends through the housing to allow for resetting the mechanism after the unsafe condition is corrected.

In a second embodiment, a latching mechanism is provided for maintaining the movable contacts in electrical engagement with the stationary contacts, which essentially consists of a support bar having a flange which engages a metallic latching member. The latching member is spring biased into the engagement position, so that as a reset button is pushed, the support member moves into engagement with the latching member. An electromagnet is provided having a solid core, and the electromagnet is responsive to a signal generated by the sensing circuit. The electromagnet, in response to the signal generated by the sensing circuit, generates a magnetic field which attracts the metallic latching member to the core. As the latching member moves, the support member is released, thus allowing the movable contacts to move out of engagement with the stationary contacts to interrupt the circuit.

BRIEF DESCRIPTION OF THE DRAWINGS

The foregoing features of the present invention will become more readily apparent and may be understood by referring to the following detailed description of an illustrative embodiment of the appliance circuit interrupter switching device, taken in conjunction with the accompanying drawings, in which:

FIG. 7 illustrates a side cutaway plan view of a second alternate embodiment of the switching device of the present invention in the set position;

FIG. 8 illustrates a side cutaway plan view of the switching device of FIG. 7 in the tripped position;

FIG. 9 illustrates a side cutaway plan view of the switching device of FIG. 8 in the tripped and unenergized position;

FIG. 10 illustrates a side cutaway plan view of the switching device of FIG. 7 in the reset position.

DETAILED DESCRIPTION OF THE PREFERRED EMBODIMENTS

Figure 1:
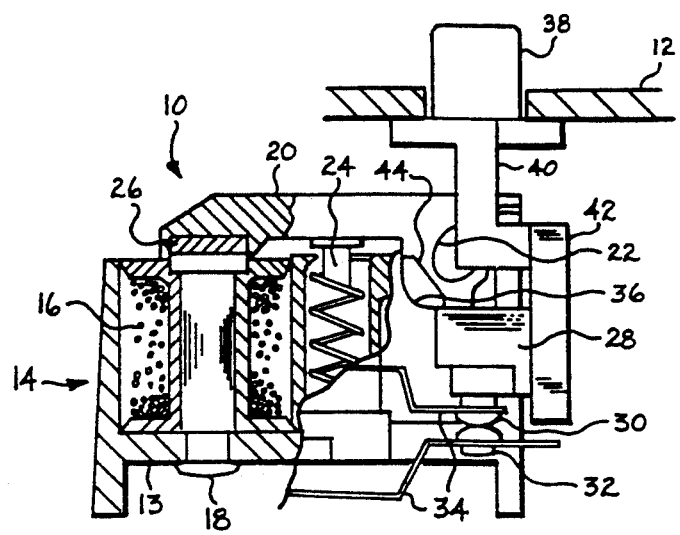
FIG. 1 illustrates a side cutaway plan view, partially in cross section, of the switching device of the present invention in the set position.

Referring now in specific detail to the drawings, in which like reference numerals identify similar or identical elements throughout the several views, FIG. 1 shows the essential components of the switching device of the present invention. Switching device 10 is preferably a separate unit from the appliance with which it is to be used, and is connected to the appliance by a power supply cord (not shown) typically comprising a pair of wire leads terminating in a standard plug body. The switching device 10 may also be constructed integrally with the appliance, and be provided with an extended power supply cord having plug blades for attachment to an electrical outlet.

In the embodiment shown in FIG. 1, switching device 10 is provided with a housing enclosure 12 which may be constructed of any suitable electrically insulating material such as plastic. Within the housing the switching device 10 is secured to a frame 13 which may be integral with the housing or be separably mounted to the interior of the housing. An electromagnet device 14 is provided and secured to frame 13, and consists of windings 16 which are wound about a solid iron core 18. Core member 18 is preferably non-movable, and becomes polarized when windings 16 are energized. A pivotable lever arm 20 comprises part of the latching mechanism which comprises switching device 10. Lever arm 20 is secured at one end about a pivot point 22, and is biased away from electromagnet 14 by spring member 24. At the end of lever arm 20 adjacent core 18 of electromagnet 14 is provided a permanent magnet 26 which is attracted to and secures itself to core 18 when switching device 10 is in the set position.

In order to maintain switching device 10 in the set position, locking member 28 is provided which holds lever arm 20 in the set position to allow permanent magnet 26 to attach to core 18. Locking member 28 provides a blocking means to hold lever arm 20 in the set position by engaging shoulder portion 36 as best seen in FIG. 1. When locking member 28 is in this position, movable contact 30 engages stationary contact 32 to complete the electrical circuit and allow for current flow through the switching device to the appliance with which device 10 is used. Movable contacts 30 and stationary contacts 32 are connected by contact bars 34, which connect switching device 10 to the circuit. A reset mechanism is provided, whose function will be described below.

As stated above, switching device 10 may form part of the appliance directly or be remote from the appliance, and may preferably be provided as part of the plug housing. Switching device 10 is electrically connected to a conventional sensing circuit which senses the presence of a ground fault or leakage current which exceeds a predetermined level. The sensing circuit may be provided within housing 12, or may be remote from switching device 10 and may be positioned within the housing of the appliance itself. In any event, operation of switching device 10 for interrupting a circuit upon the detection of a ground fault or leakage current exceeding a predetermined level will now be described.

Figure 2:
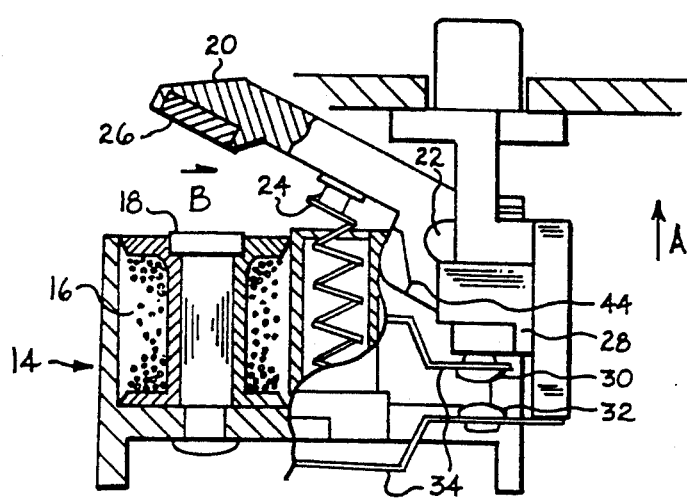
FIG. 2 illustrates a side cutaway plan view of the switching device of FIG. 1 in the tripped position.

As best seen in FIG. 2, upon detection of leakage current, a signal is generated by the sensing circuit and is delivered to electromagnet 14. Upon detection of this signal, electromagnet 14 is energized at windings 16, and the magnetic field is generated as at B, which has the same polarity as permanent magnet 26. This magnetic field serves to repel permanent magnet 26, and consequently lever arm 20. As lever arm 20 pivots about pivot point 22, shoulder portion 36 passes locking member 28 at clearance area 44. As locking member 28 passes clearance area 44, contact bar 34 of movable contact 30 causes locking member 28 to rise in the direction of arrow A, thus using the flexibility and resiliency of contact bar 34 to instantaneously separate movable contact 30 from stationary contact 32 to break the circuit and turn the appliance off. Spring 24 maintains lever arm in the tripped condition as shown in FIG. 2.

Figure 3:
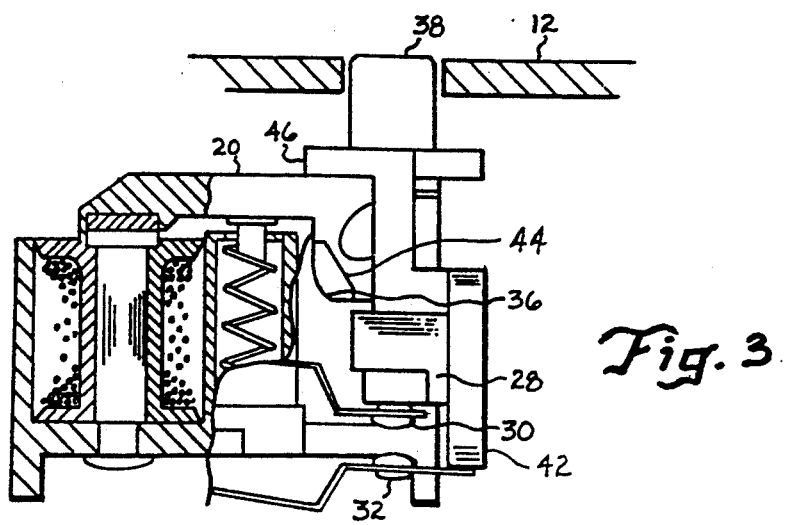
FIG. 3 illustrates a side cutaway plan view of the switching device of FIG. 1 in the reset position.

After the dangerous condition is corrected, i.e., when the leakage current is no longer detected by the sensing circuit thus terminating the signal to electromagnet 14, switching device 10 may be reset as shown in FIG. 3. Reset button 38 which extends beyond housing 12 is depressed to move post member 40 into engagement with locking member 28. As button 38 is depressed, extension member 42 contacts stationary contact 32 and its associated contact bar to move contact bar 34 away from movable contact 30. As button 38 is fully depressed, shoulder 46 engages arm 20 to push arm 20 against the biasing of spring 24 to allow permanent magnet 26 to secure itself to core 18. As the button 38 is fully depressed, locking member 28 passes shoulder portion 36 as seen in FIG. 3, so that as the button is released locking member 28 engages shoulder portion 36 as best seen in FIG. 1. When the button is fully released, extension member 42 releases stationary contact 32 to allow stationary contact 32 to engage movable contact 30 which is held in place by locking member 28. Switching device 10 is now reset so that the appliance may be used in the normal manner.

While it is preferred that switching device 10 be constructed in a housing 12 that is remote from the appliance, should switching device 10 be used as part of the appliance it is understood that housing 12 about the switching device 10 is waterproofed so that should the appliance be immersed in water, the circuit may be broken to prevent a shock hazard.

Figure 4:
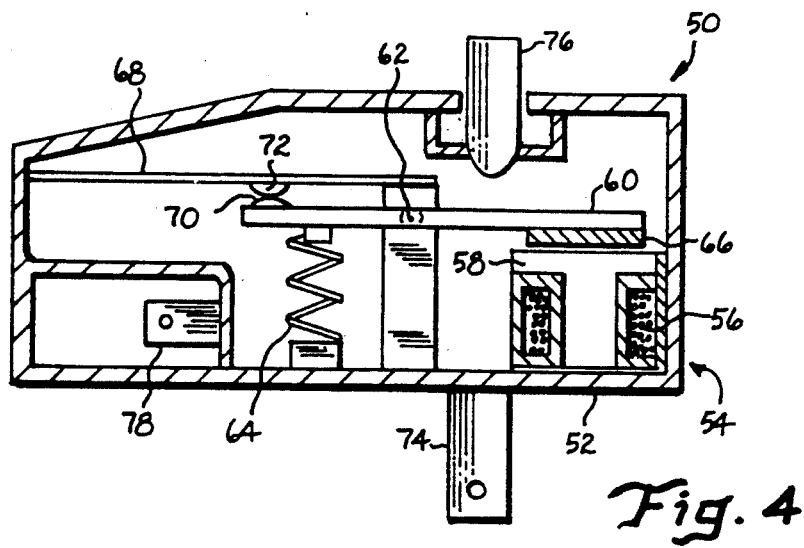
FIG. 4 illustrates a side cutaway plan view of an alternate embodiment of the switching device of the present invention in the set position.

Turning now to FIG. 4, an alternate embodiment of the switching device of the present invention is shown. Switching device 50 is constructed as a plug housing for connection to an electrical outlet and is constructed within housing 52. Housing 52 may be any suitable material which is electrically insulating, and is preferably plastic. Switching device 50 essentially comprises an electromagnet 54 having windings 56 and a solid soft iron core 58. A pivotable lever arm 60 is provided which is biased by a spring 64 to the unlatched or tripped position. A pivot point 62 is provided about which lever arm 60 rotates. A permanent magnet 66 is provided at the end of lever arm 60 adjacent electromagnet 54. At the opposite end of lever arm 60, is provided movable contacts 70 which engage stationary contacts 72 when the lever arm 60 is in the set position as shown in FIG. 4. Stationary contacts 72 are positioned adjacent to or on printed circuit board 68, which contains the sensing circuit for detecting leakage current or ground fault.

Switching device 50 is part of a plug housing for connecting the appliance to an electrical outlet. In use, blades 74 provide a means for connecting the plug body to the electrical outlet, and pins 78 allow for connection of a power supply cord having at least a pair of wire leads which connects the device 50 to the appliance. A reset button 76, whose function will be described below, may also be provided.

Figure 5:
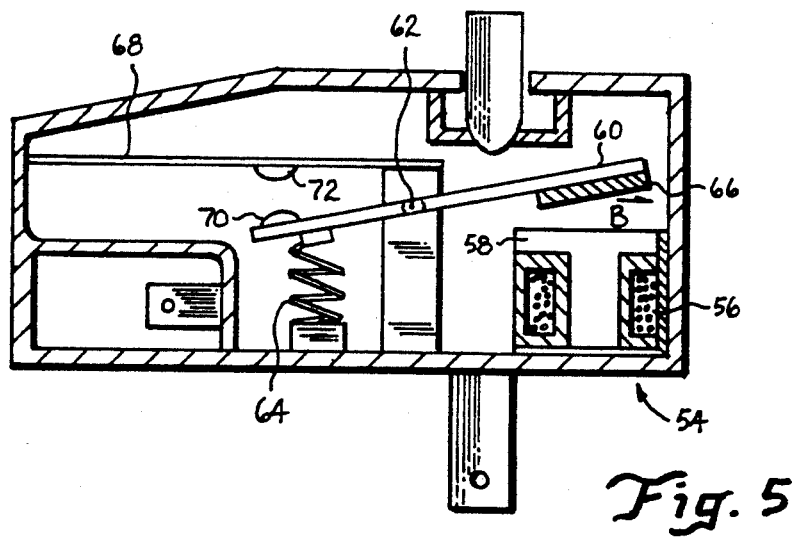
FIG. 5 illustrates a side cutaway plan view of the switching device of FIG. 4 in the tripped position.

In the set position as shown in FIG. 4, permanent magnet 66 attaches to core 58 of the electromagnet 54. When in this position, movable contacts 70 engage stationary contacts 72 to complete the electrical circuit and to provide power to the appliance. As best seen in FIG. 5, upon detection of leakage current, the sensing circuit provided on printed circuit board 68 generates a signal which is received by electromagnet 54 to energize windings 56. Energization of windings 56 creates a magnetic field to magnetize solid core 58. The magnetic field generated is of the same polarity as the permanent magnet 66, which repels permanent magnet 66 to pivot lever arm 60 about pivot point 62. As lever arm 60 is repelled to the position shown in FIG. 5, movable contacts 70 are moved away from stationary contacts 72 to interrupt the circuit and prevent current from passing through switching device 50 to the appliance, thus turning the appliance off instantaneously.

Figure 6:
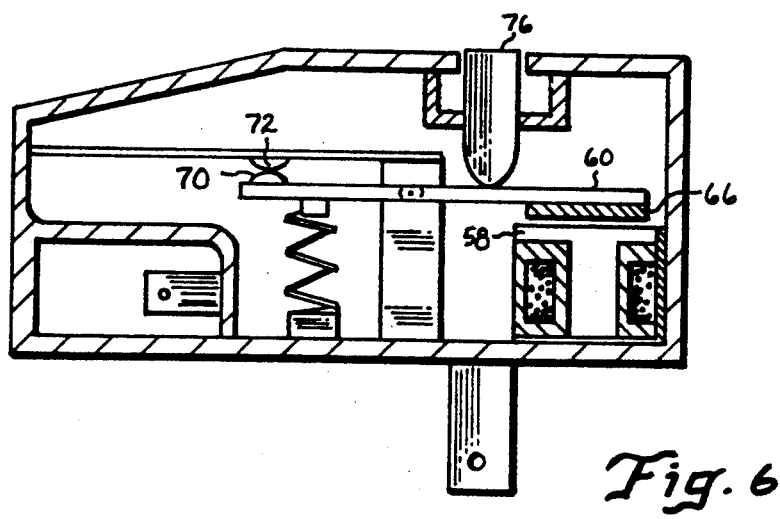
FIG. 6 illustrates a side cutaway plan view of the switching device of FIG. 4 in the reset position.

FIG. 6 illustrates the reset position of switching device 50, in which push button 76 is depressed to engage lever arm 60 and move lever arm 60 to the position shown in FIG. 4. In this position, permanent magnet 66 re-engages core 58 of electromagnet 54, so that movable contacts 70 engage stationary contacts 72 to complete the circuit.

Turning now to FIG. 7, there is illustrated a further embodiment of the switching device of the present invention. Switching device 80 provides a plug body for connection to an electrical outlet, and switching device 80 is connected to an appliance by a power supply cord (not shown).

Device 80 consists of a switching mechanism located inside a housing 82, which again is preferably a plastic material or any other non-conducting insulating material. Inside housing 82 is provided an electromagnet 84 which is connected to housing 82 by a frame member 83. A sensing circuit (not shown) is provided which generates a signal to turn on electromagnet 84 upon the detection of leakage current or a ground fault condition. Electromagnet 84 consists of windings 86 and a solid core 88.

A pivotable lever arm 90 is provided for setting switching device 80 to the operating condition. Lever arm 90 pivots about pivot point 92 to contact a locking member 94. Locking member 94 is provided with a flange 96 which engages a corresponding flange 99 in a latching member 98. Latching member 98 is preferably a metallic material whose function will be described below.

As lever arm 90 rotates to move locking member 94 into engagement with latching member 98, tabs 108 of locking member 94 engages contact arms 104 which support moving contacts 100. Arms 104 are resiliently constructed to bias movable contacts 100 away from stationary contacts 102. Movement of locking member 94 forces movable contacts 100 into engagement with stationary contacts 102. Stationary contacts 102 are mounted, preferably, directly to plug blades 110 as best seen in FIG. 7.

Upon the detection of leakage current or a ground fault by the sensing circuit, electromagnet 84 is energized and windings 86 create a magnetic field which attracts latching member 98 to solid core 88 as best seen in FIG. 8. As latching member 98 is moved towards solid core 88, flange 99 disengages from flange 96 of locking member 94, and the resiliency of contact arms 104 move movable contacts 100 away from stationary contacts 102 to drive locking member 94 upward as best seen in FIG. 8. As movable contacts 100 disengage from stationary contacts 102, the circuit is broken, and current is shut off to the appliance through switching device 80.

As the signal from the sensing circuit is removed from electromagnet 84, spring 109 causes latching member 98 to pivot about pivot point 106 to the position shown in FIG. 9. In order to reset the switching device 80, push button 114 is depressed as shown in FIG. 10, which pivots lever arm 90 about pivot point 92 to engage locking member 94. Locking member 94 is then moved against the resiliency of contact bars 104 to allow flange 96 to engage flange 99 of latching member 98. Contacts 100 and 102 and then engaged to complete the circuit. Reset button 114 is constructed of post 114 which engages lever arm 90, and spring 118 allows push button 114 to return to its initial position after switching device 80 is reset.

While the invention has been particularly shown and described with reference to the preferred embodiments, it will be understood by those skilled in the art that various modifications and changes in form and detail may be made therein without departing from the scope and spirit of the invention. Accordingly, modifications such as those suggested above, but not limited thereto, are to be considered within the scope of the invention.

What is claimed is:

1. A switching device for opening a circuit upon detection of a predetermined leakage current level, said device comprising:
 a housing;
 sensing circuit means for detecting said leakage current, said sensing circuit means generating a signal upon detection of leakage current;
 electromagnet means having a solid core;
 electrical contact means including a pair of stationary contacts and a corresponding pair of movable contacts, said movable contacts movable between a set position in which said movable contacts contact said stationary contacts to maintain said circuit and conduct electricity through said contacts, and a tripped position in which said movable contacts are spaced from said stationary contacts such that said circuit is open and electricity does not flow through said contacts; and
 a latching mechanism for maintaining said movable contacts in electrical contact with said stationary contacts, said latching mechanism including a pivotable arm, a permanent magnet secured to an end of said arm, a biasing means for biasing said arm to a position corresponding to said tripped position of said contacts, and an engagement member for securing said arm in a position corresponding to said set position of said contacts;
 said contacts being spaced apart when said arm is in said tripped position and being in electrical contact when said arm is in said set position; said permanent magnet being attracted to said solid core of said electromagnet when said arm and said contacts are in said set position;
 wherein said electromagnet means generates a magnetic field in response to said signal from said sensing circuit means, said field having the same polarity as said permanent magnet to repel said magnet from said core, said arm and contacts being moved as said magnet is repelled form said set position to said tripped position to open said circuit and interrupt electrical flow between said contacts.

2. A switching device according to claim 1, said device further comprising reset means for moving said arm and contacts to said set position.

3. A switching device according to claim 2, wherein said reset means comprises a push button extending beyond said housing, a shaft, and a shoulder portion, said shoulder portion contacting said engagement member of said latching mechanism to move said arm and said contacts into said set position.

4. A switching device according to claim 1, wherein said biasing means of said latching mechanism comprises a spring.

5. A switching device according to claim 1, wherein said arm includes a shoulder portion adjacent a pivot point, said shoulder portion engaging said engagement member to secure said arm in said set position.

6. A switching device according to claim 1, wherein said housing comprises a plug housing for an appliance, said plug housing having blades extending therefrom in electrical connection with said contacts and said appliance, said blades being connectable to an electrical outlet to provide power to said appliance.

7. A switching device according to claim 1, wherein said contacts are mounted on at least one bar member, said bar members being electrically conductive and being biased away from each other such that said contacts are biased to said tripped position.

8. A switching device for interrupting an electrical circuit upon detection of a predetermined leakage current level, said device having a housing, means for connecting said switching device to a source of power at an electrical outlet, and means for connecting said switching device to an appliance, said device comprising:
 a sensing circuit for detecting said leakage current;
 an electromagnet having a solid core;
 at least one pair of electrical contacts, said contacts including at least one stationary contact and one movable contact, said movable contact being biased to a trip position away from said stationary contact, and said movable contact being movable to a set position in contact with said stationary contact;
 a latching mechanism including a permanent magnet mounted on a pivotable arm, said pivotable arm engaging said movable contact to urge said movable contact into electrical contact with said stationary contact when said arm is in a first position corresponding to said set position, said arm being pivotable to a second position corresponding to said trip position and disengaging said movable contact to allow said movable contact to move away from said stationary contact to said trip position, said permanent magnet being attracted to said solid core of said electromagnet to maintain said pivotable arm and said movable contact in said set position;
 wherein said electromagnet generates a magnetic field in response to an electrical signal generated by said sensing circuit upon detection of leakage current, said magnetic field being of the same polarity as said permanent magnet to repel said magnet from said solid core, such that said magnet, said pivotable arm and said movable contact move to said trip position to interrupt electrical flow to said appliance.

9. A switching device according to claim 8, wherein electrical contacts comprise two pairs of contacts to interrupt both a neutral line and a hot line of said source of power.

10. A switching device according to claim 8, wherein said pair of electrical contacts are in a hot line of said source of power.

11. A switching device according to claim 8, wherein said means for connecting said switching device to said power source comprises a pair of plug blades extending from said housing, at least one of said plug blades being electrically connected to said stationary contact.

12. A switching device according to claim 8, wherein said means for connecting said switching device to an appliance comprises a pair of wire leads, at least one of said leads being electrically connected to said movable contact.

13. A switching device according to claim 8, wherein said device further comprises a reset means, said reset means being actuable to move said permanent magnet, said arm and said movable contact from said trip position to said set position, said reset means being actuable when said sensing means does not sense leakage current.

14. A switching device according to claim 13, wherein said reset means comprises a push button extending through said housing, such that pushing said button sets said switching device.

15. A switching device according to claim 8, wherein said pivoting arm includes a shoulder portion which engages a corresponding shoulder portion on said latching mechanism when said arm is in said set position to maintain said contacts in electrical engagement in said set position.

16. A switching device according to claim 8, wherein said movable contacts are mounted on flexible arm members which bias said movable contacts away from said stationary contacts.

17. A switching device according to claim 8, wherein said pivotable arm is biased away from said core of said electromagnet by a spring member.

18. A switching device according to claim 17, wherein said electromagnet is unenergized until said sensing circuit detects leakage current and generates a signal which is received by said electromagnet to energize said electromagnet, such that said magnetic field is generated to repel said permanent magnet and move said arm and movable contacts into said trip position to interrupt said electrical flow to said appliance.

19. A switching device according to claim 13, wherein said reset means comprises an extension member connected to said latching mechanism, such that actuation of said reset means actuates said latching mechanism.

20. A switching device according to claim 8, wherein said electromagnet solid core comprises iron.

21. An appliance leakage current interrupter device, said device including a housing, a sensing circuit for detecting leakage current, plug blades for connecting said device to a power source at an electrical outlet, and wire leads for connecting said device to an appliance, said device comprising:

stationary contacts electrically connected to said plug blades;

movable contacts mounted on flexible bar members and being electrically connected to said wire leads;

said bar members biasing said movable contacts away from said stationary contacts and being electrically connected to said wire leads to said appliance;

an electromagnet having a solid core, said electromagnet being responsive to a signal generated by said sensing circuit upon detection of leakage current, said electromagnet generating a magnetic field in response to said signal; and a latching mechanism for urging said movable contacts into engagement with said stationary contacts, said latching mechanism including a support bar for engaging said bar members of said movable contacts, said support bar having a first flange for engaging a spring biased latching member to latch said movable contacts in electrical engagement with said stationary contacts;

wherein said magnetic field generated by said electromagnet actuates said latching member to unlatch said support bar to disengage said movable contacts from said stationary contacts to interrupt electric current through said device to said appliance.

22. A device according to claim 21, wherein said latching member is metallic and is attracted to said electromagnet by said magnetic field to unlatch said support bar.

23. A device according to claim 21, wherein said latching member includes a permanent magnet of the same polarity as said magnetic field and which is repelled by said magnetic field away from said electromagnet to unlatch said support bar.

24. A device according to claim 21, said device further comprising a reset mechanism which engages said support bar to engage said movable contacts with said stationary contacts.

25. A device according to claim 24, wherein said reset mechanism comprises a push button which contacts a pivotable lever, said lever engaging a second flange on said support bar to urge said support bar and movable contacts to latch said first flange to said locking member.

* * * * *